Sept. 24, 1929.   W. L. CHILDS   1,729,064
SWAB RUBBER
Filed Oct. 31, 1927
Fig. 1.
Fig. 2.
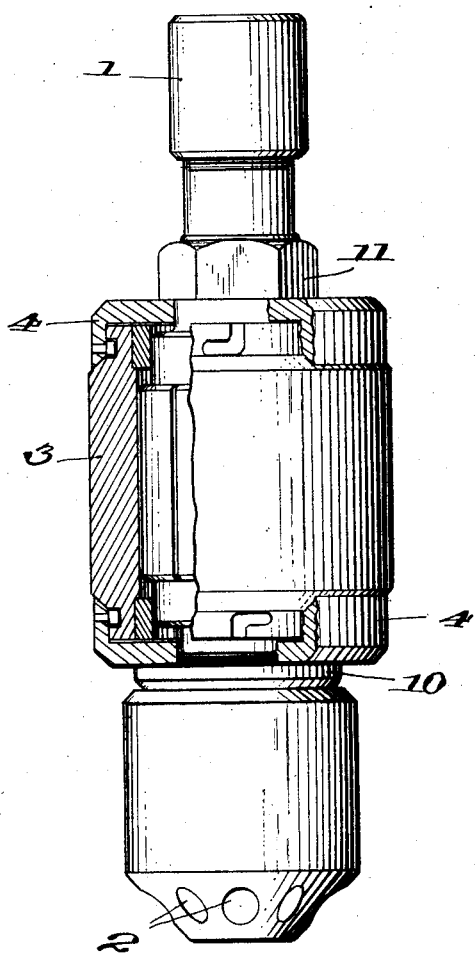
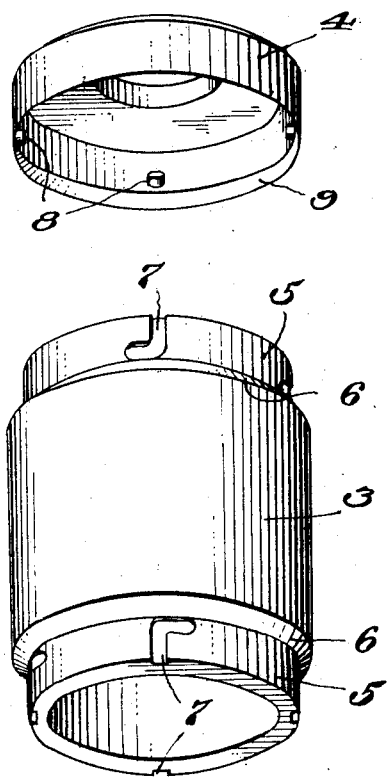
Fig. 3.
Inventor
William L. Childs
By Vincent Martin
Attorney Patented Sept. 24, 1929

1,729,064

UNITED STATES PATENT OFFICE

WILLIAM L. CHILDS, OF HOUSTON, TEXAS, ASSIGNOR TO REED ROLLER BIT COMPANY, OF HOUSTON, TEXAS, A CORPORATION OF TEXAS

SWAB RUBBER

Application filed October 31, 1927. Serial No. 230,109.

This invention relates to well swabs, and has for its specific object the provision of a new and improved swab rubber and supporting means therefor.

In the accompanying drawings, which are illustrative of the preferred embodiment of the invention, Fig. 1 is a partly sectional side elevation; Fig. 2, a detail perspective view of one of the supporting rings; and Fig. 3, a detail perspective view of the swab rubber.

The swab shown by Fig. 1 is of the general type well-known in the art, and embodies the usual tubular body 1 through which water, gas and oil pass when it is lowered into the well casing by a cable or like device, not shown, the lower end of body 1 being provided with a plurality of entrance ports 2.

Adapted for use on swabs of this type, this invention provides a new and improved swab rubber 3 and supporting rings 4 therefor, the construction and advantages of which will now be pointed out.

The sleeve body 3 of the rubber has reduced end portions 5, tapered intermediate portions 6, and angular slots 7 in the peripheral surface of said end portions 5. The supporting rings 4 are cup-shaped and are provided with internal lugs or pins 8, the edge of said ring immediately adjacent said pins being tapered as shown at 9.

The parts are assembled by inserting the reduced end portions 5 of the rubber into the rings 4 so that the pins 8 enter slots 7, the rings and rubber then being rotated with respect to each other to move said pins to the inner end of said slots and thereby lock the parts together, the tapered portion 6 and edge 9 being then held in snug contact with each other.

Thus the invention provides a device sorely needed in the art, that is, a rigidly supported swab rubber capable of standing up under the most severe use.

When the embodiment of the invention shown is to be used with the type of swab shown, it may be mounted thereon in any suitable manner, but it may be remarked that the device will be found particularly useful therewith because of the adjustable, threaded members 10 and 11. When the rubber with its rings is placed on the swab between the members 10 and 11, said members may be screwed toward each other to effect longitudinal compression and conesquent lateral expansion of said rubber in order that a pipe of a comparatively greater internal diameter may thereby be cleaned. When this is done, the cooperating parts of the swab rubber and rings provided by this invention serve to rigidly hold the ends of the rubber in place.

The number and contour of slots 7 and the pins 8 may, of course, be varied.

I claim:

1. A swab rubber having a groove therein, and a supporting ring having a pin fitting in said groove.

2. A swab rubber having an angular groove therein, and a supporting ring having a pin fitting in said groove.

3. A swab rubber having a groove therein and a tapered portion, and a supporting ring having a pin and a tapered portion, said pin fitting in said groove and said portions being in contact, when said rubber and ring are united.

4. The combination with a swab having relatively movable members, of a swab rubber and supporting rings therefor, said rubber having a groove and said ring having a pin fitting in said groove.

5. A substantially cylindrical swab rubber having reduced ends and external angular grooves in said ends for the reception of supporting pins.

6. A substantially cylindrical swab rubber having reduced ends, external angular grooves in said ends for the reception of supporting pins, and tapered portions between and adjacent said reduced ends.

7. A substantially cylindrical swab rubber having reduced ends and external angular grooves in said ends, and removable supporting rings on said ends and having internal pins fitting in said grooves.

8. A substantially cylindrical swab rubber having reduced ends, external angular grooves in said ends, and tapered portions between and adjacent said ends, and removable supporting rings on said ends and provided with tapered internal surfaces in contact with said portions and internal pins fitting in said grooves.

In testimony whereof, I hereunto affix my signature, this 14th day of October, 1927.

WILLIAM L. CHILDS.